May 21, 1929.    T. H. THOMAS    1,714,056
ELECTROPNEUMATIC BRAKE
Filed Aug. 24, 1927
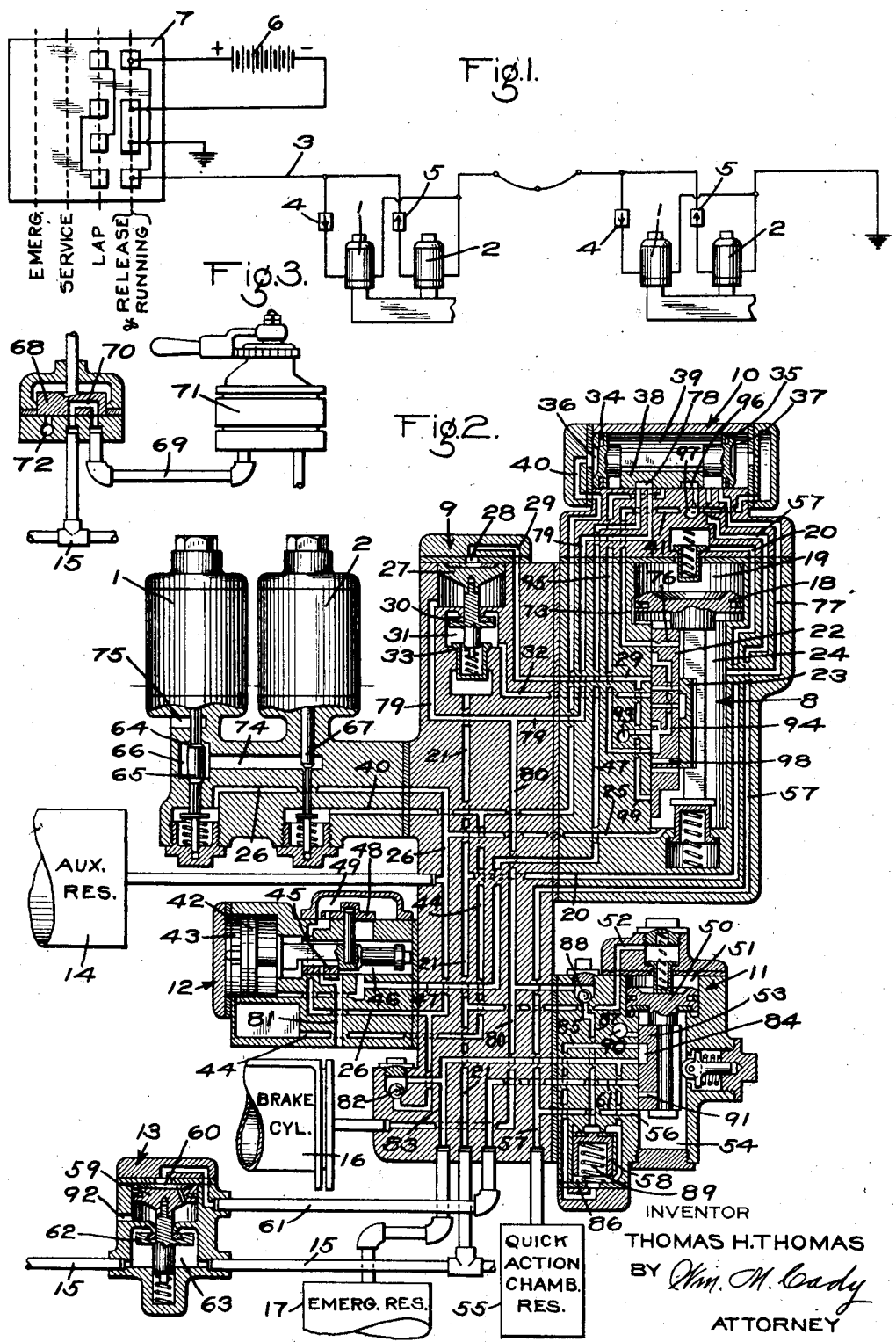
INVENTOR
THOMAS H. THOMAS
BY Wm. M. Cady
ATTORNEY

Patented May 21, 1929.

1,714,056

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed August 24, 1927. Serial No. 215,071.

This invention relates to electro-pneumatic brakes, and has for its principal object to provide an improved electro-pneumatic brake equipment.

Other objects and advantages will appear in the following more detailed description of the invention.

In the accompanying drawing; Fig. 1 is a diagrammatic view of an electro-pneumatic brake equipment embodying my invention; Fig. 2 a central sectional view of the electro-pneumatic valve mechanism employed on each car of the train in connection with the equipment shown in Fig. 1; and Fig. 3 a view of a portion of the pneumatic brake controlling apparatus employed in connection with my invention.

According to my invention, two magnets 1 and 2 are provided on each vehicle of the train, said magnets being connected in parallel to a train wire 3, said train wire being connected to ground at the rear end of the train. On the controlling vehicle of the train is provided a switch device 7, shown developed in Fig. 1. In the local circuit of magnet 1 is a rectifier 4 or other device for permitting flow of current only in one direction, as indicated by the arrow, and in the local circuit of magnet 2 is a rectifier 5 which permits flow of current through magnet 2 only in one direction, the reverse of the permitted current flow through magnet 1.

In the release and running position of the brake switch, a source of current 6 is connected so as to complete a circuit through ground, including the train wire 3 and with the current flow in a direction to pass the rectifier 4, so as to energize the magnets 1. In the lap position of the brake switch, the source of current is so connected, that the current flow through the train wire 3 is in the reverse direction, so that current then flows through the rectifiers 5 to energize the magnets 2.

In service position, the train wire circuit is open, so that both magnets are held deenergized, and this is also the case in emergency position.

As shown in Fig. 2, the magnets 1 and 2 are associated with an electro-pneumatic valve mechanism having a pneumatic portion or triple valve device 8, a quick action valve device 9, a change-over valve device 10, an emergency high pressure valve device 11, a brake cylinder pressure maintaining valve device 12, a quick action valve device 13, an auxiliary reservoir 14, a brake pipe 15, a brake cylinder 16, and an emergency reservoir 17.

The triple valve device 8 shown is of the retarded release, quick service type, though any other type of triple valve may be employed, and comprises a piston 18 contained in piston chamber 19, which chamber is connected through passages 20 and 21 with the brake pipe 15. A main slide valve 22 and a graduating slide valve 23, contained in valve chamber 24 are adapted to be operated by piston 18, the valve chamber 24 being connected through passages 25 and 26 with the auxiliary reservoir 14.

The quick action valve device 9 comprises a piston 27 contained in piston chamber 28, having a passage 29 leading to the seat of slide valve 22, a vent valve 30 operated by piston 27 and contained in valve chamber 31, having a passage 32 leading to the seat of slide valve 22, and a check valve 33, controlling communication from brake pipe passage 21 to chamber 31.

The change-over valve device 10 comprises connected pistons 34 and 35 contained in the respective piston chambers 36 and 37 and a slide valve 38 adapted to be operated by said pistons and contained in valve chamber 39.

The piston chamber 36 is connected to a passage 40 and piston chamber 37 to a passage 41, leading to the seat of slide valve 22.

The brake cylinder pressure maintaining valve device 12 comprises a piston 42 contained in piston chamber 43, having a passage 44 which is connected to passage 40, a release slide valve 45 contained in valve chamber 46 connected to passage 47, and an application slide valve 48, contained in valve chamber 49, which is connected to passage 26.

The emergency high pressure valve device 11 comprises a piston 50 contained in piston chamber 51 connected to passage 52 leading to brake pipe passage 21 and a slide valve 53 contained in valve chamber 54 and adapted to be operated by piston 50, the valve chamber 54 being connected to a quick action chamber 55 through passages 56 and 57. A high pressure supply valve is provided in the form of a valve piston 58, said valve piston being controlled by the operation of the valve device 11.

The quick action vent valve device 13 comprises a piston 59 contained in piston chamber 60 connected to a pipe and passage 61, leading to the seat of slide valve 53 and a vent valve 62 operable by piston 59 and contained in valve chamber 63, which is open to the brake pipe 15.

The magnet 1 is adapted to control the operation of double beat valves 64 and 65 contained in valve chamber 66 and the magnet 2 a valve 67.

Associated and movable with the brake switch 7 is a rotary valve 68 and said valve in all positions except emergency position is adapted to connect the brake pipe 15 through cavity 70 with pipe 69 leading to the usual engineer's brake valve 71. In the emergency position, communication between the pipe 69 and the brake pipe 15 is cut off and the brake pipe 15 is connected to an atmospheric exhaust port 72.

In operation, with the brake switch 7 in the running and release position, and the brake valve device 71 in running position, the brake pipe 15 is charged with fluid under pressure and fluid under pressure is supplied from the brake pipe through passages 21 and 20 to piston chamber 19 of the triple valve device 8, moving the piston 18 to its normal release position, as shown in the drawing. In this position, fluid is supplied from piston chamber 19 through the usual feed groove 73 to valve chamber 24 and from said valve chamber through passages 25 and 26 to the auxiliary reservoir 14. The valve chamber 49 of the valve device 12 being connected to passage 26 is also charged with fluid under pressure.

The magnet 1 is energized in the running position of the brake switch 7, so that valve 65 is held seated, while valve 64 is held unseated. The magnet 2 is deenergized, so that valve 67 is held unseated. Passage 40 is therefore open to chamber 74 and said chamber being connected to valve chamber 66 is open to the atmospheric vent port 75. Piston chamber 36 of the change-over valve device 10 is consequently maintained at atmospheric pressure. In the normal release position of the triple valve device 8, a port 76 through slide valve 22 registers with passage 41, so that fluid under pressure is supplied from valve chamber 24 to piston chamber 37. The pistons 34 and 35 are thus held in their left hand position, as shown. In this position, fluid under pressure, supplied from valve chamber 24, through passage 77 to valve chamber 39, is supplied through passage 57 to the quick action chamber 55 and to the valve chamber 54.

The slide valve 38 in this position, connects passage 47, through cavity 78, with passage 79, which leads to passage 80, the passage 80 being connected to the brake cylinder 16.

The passage 44 being open to the atmosphere through passage 40 and the exhaust port 75, the piston 42 of the valve device 12 is maintained in its left hand position, as shown, in which valve chamber 46 is connected to an atmospheric exhaust passage 81 and the brake cylinder 16 being connected to valve chamber 46, through passage 80, passage 79, cavity 78, and passage 47, is maintained at atmospheric pressure.

Fluid under pressure is supplied from the auxiliary reservoir 14 through passage 26 and past check valve 82 to passage 83, so that the emergency reservoir 17 is charged with fluid under pressure. Passage 83 leads to the seat of slide valve 53 and in the normal release position, as shown in the drawing, said passage is connected through cavity 84 with a passage 85, leading to the chamber 86 at the under side of the valve piston 58. The outer seated area of the valve piston 58 at the opposite side is also connected to passage 83, while the inner seated area is connected through a passage 87 past a check valve 88 with brake cylinder passage 80. The valve piston 58 is therefore held seated in its upper position by the fluid pressure in chamber 86 as assisted by the spring 89.

If it is desired to effect an electric service application of the brakes, the brake switch 7 is turned to service position, in which both magnets 1 and 2 are deenergized. The magnet 1 being deenergized, the valve 64 is seated while the valve 65 is unseated. Fluid under pressure is then supplied from the auxiliary reservoir 14 through passage 26 to chamber 74 and thence past the unseated valve 67 to passage 40 and thence to passage 44. The piston 42 is then shifted to the right, so as to operate the release valve 45 and cut off the valve chamber 46 from the exhaust passage 81 and to shift the valve 48, so as to open communication from valve chamber 49 to valve chamber 46. Fluid under pressure is then supplied from the auxiliary reservoir 14 and the valve chamber 49 to valve chamber 46 and thence flows to the brake cylinder 16 through passage 47.

Fluid under pressure flows to the brake cylinder so long as the brake switch 7 is held in service position. When the desired brake cylinder pressure is attained, the brake switch is moved to lap position. It will be noted that fluid under pressure is also supplied through passage 40 to piston chamber 36 of the change-over valve device 10, but since the fluid pressure in piston chamber 37 is maintained, so long as the triple valve device 8 remains in released position, the change-over valve device is maintained in its left hand position.

In lap position, the magnet 1 is held deenergized, while the magnet 2 is energized. The energization of magnet 2 operates to seat the valve 67, so that the further flow of fluid under pressure to the piston chamber 43 is cut off.

When the brake cylinder pressure has been increased to a degree slightly exceeding the pressure of fluid supplied to piston chamber 43, said pressure, acting in valve chamber 46 on piston 42, operates to move the slide valve 48 so as to cut off the further flow of fluid to the brake cylinder.

So long as the brake switch 7 is held in lap position, the fluid pressure in piston chamber 43 is bottled up and if leakage of fluid under pressure from the brake cylinder should occur, then the higher pressure in piston chamber 43 will operate to shift the piston 42 and the slide valve 48 so as to admit fluid to the brake cylinder until the brake cylinder pressure has again been increased substantially to the degree of pressure held in piston chamber 43.

Thus the valve device 12 operates to maintain the pressure in the brake cylinder against leakage and regardless of brake cylinder travel.

If it is desired to release the brakes, the brake switch 7 is moved to the running and release position, in which the magnet 1 is energized and the magnet 2 deenergized. The valve 67 is therefore held unseated, the valve 65 seated and the valve 64 unseated. Fluid under pressure in piston chamber 43 is then vented to the atmosphere through exhaust port 75 and the piston 42 is shifted to its left hand position by the brake cylinder pressure acting in valve chamber 46, so that the release valve 45 is shifted to its release position, in which fluid is vented from the brake cylinder to effect the release of the brakes.

To effect an emergency application of the brakes, the brake switch 7 is moved to emergency position. In this position, the magnets 1 and 2 are deenergized as in service position, and the apparatus operates electrically the same as in effecting a service application of the brakes.

In addition, however, the movement of the brake switch to emergency position also operates the rotary valve 68, so that the brake pipe 15 is connected to an atmospheric exhaust port 72.

The brake pipe pressure being thus suddenly reduced, the piston 50 of the high pressure emergency valve device 11 is shifted to its outer position, in which cavity 84 in slide valve 53 connects passage 85 with an exhaust port 90. Fluid under pressure is then vented from the under side of the valve piston 85, so that the fluid pressure acting on the outer seated area of the valve piston at its upper face, operates to shift the valve piston to its lower seat. Communication is then established from the emergency reservoir 17, through passage 83 to passage 87 and thence fluid flows past the check valve 88 to passage 80 and the brake cylinder 16.

The brake cylinder is therefore supplied with fluid from the emergency reservoir 17 as well as from the auxiliary reservoir 16 by the operation of the electrically controlled means, so that a high pressure is obtained in the brake cylinder in an emergency application of the brakes.

The outward movement of slide valve 53 also causes a port 91 to register with passage 61, so that fluid under pressure is supplied from valve chamber 54 to piston chamber 60 of the vent valve device 13. Piston 59 is then shifted downwardly, so as to unseat the vent valve 62 and cause the local venting of fluid from the brake pipe 15 to the atmosphere by way of exhaust port 92.

Quick serial action of the emergency valve devices 11 throughout the train is thus secured and thereby the corresponding quick serial building up of brake cylinder pressure to the high emergency pressure.

It may be necessary to control the brakes pneumatically, as for example, when engines are changed and the train is operated by an engine not equipped for electric control or where electrically equipped vehicles are connected in a train with vehicles not so equipped.

If it is desired to control the brakes pneumatically, the brake switch 7 is first moved to service position so as to open the circuits of both magnets 1 and 2 and then a light service application of the brakes is effected by moving the usual engineer's brake valve 71 to service position. The reduction in brake pipe pressure operates to cause movement of the triple valve device 8 to service position, in which passage 41 is connected to an atmospheric exhaust port 93, through a cavity 94 in slide valve 22. Fluid under pressure is thus vented from piston chamber 37. The magnets 1 and 2 being deenergized by the movement of the brake switch to service position, the valve 65 will be unseated as well as the valve 67, so that fluid under pressure is supplied from the auxiliary reservoir 14 through passage 26 to passage 40 and thence to piston chamber 36. The pistons 34 and 35 are consequently shifted to their right hand position, moving the slide valve 38, so that passage 79 is connected to a passage 95, leading to the seat of slide valve 22. In this position, cavity 96 in the slide valve connects passage 57 with an exhaust port 97, so that fluid under pressure is vented from the quick action chamber 55 and from the valve chamber 54. The valve chamber 54 being then held at atmospheric pressure, the high pressure emergency valve device 11 is cut out of action during pneumatic operation, since a reduction in brake pipe pressure in the piston chamber 51 will not then be effective to cause the outward movement of piston 50.

The change-over valve device 10 having been shifted to its right hand position, the brake valve device may be moved to release or running position so as to recharge the system and release the brakes.

The brakes may therefore be controlled pneumatically and when the triple valve device is shifted to service position by effecting a reduction in brake pipe pressure in the usual manner, the passage 95 registers with the usual service port 98 in the slide valve 22 and fluid under pressure is supplied from the auxiliary reservoir 14 and the valve chamber 24 to passage 95 and thence through cavity 78 in the slide valve 38 to passage 79 and the brake cylinder 16.

In the release position of the slide valve 22, the passage 95 is connected through a cavity in slide valve 22 with the atmospheric exhaust port 93.

In an emergency application as effected pneumatically, the movement of slide valve 22 to emergency position causes the passage 99 to be connected to valve chamber 24, so that fluid under pressure is supplied from said chamber through passage 99 to passage 29 and thence to piston chamber 28. The quick action piston 27 is then shifted so as to open the vent valve 30 and permit the venting of fluid from the brake pipe passage 21 and the brake pipe to passage 79 and thence through passage 80 to the brake cylinder 16.

Having now described my invention, what I claim as new and desire to secure by Letters Patent, is:—

1. In a braking apparatus, the combination with means for controlling the brakes electrically and means for controlling the brakes pneumatically, of means operative to render either the electric brake controlling means or the pneumatic brake controlling means effective to control the brakes.

2. In a braking apparatus, the combination with means for controlling the brakes electrically and means for controlling the brakes pneumatically, of means adapted at one time to render the electric brake controlling means effective to control the brakes and adapted at another time to render the pneumatic brake controlling means effective.

3. In a braking apparatus, the combination with means for controlling the brakes electrically and means for controlling the brakes pneumatically, of means jointly controlled by the electric and the pneumatic brake controlling means for rendering either the electric or the pneumatic brake controlling means effective to control the brakes.

4. In a braking apparatus, the combination with means for controlling the brakes electrically and means for controlling the brakes pneumatically, of means having one position in which the electric brake controlling means is rendered effective to control the brakes and another position in which the pneumatic brake controlling means is rendered effective to control the brakes, the movement of said means to its different positions being controlled by said electric and said pneumatic brake controlling means.

5. In a braking apparatus, the combination with a brake cylinder, of electrically controlled means for supplying fluid under pressure to the brake cylinder, pneumatically controlled means for supplying fluid under pressure to the brake cylinder, and valve means adapted in one position to establish communication through which fluid under pressure is supplied to the brake cylinder by operation of said electrically controlled means and adapted in another position to establish communication through which fluid under pressure is supplied to the brake cylinder by operation of said pneumatically controlled means.

6. In a braking apparatus, the combination with a brake cylinder, of electrically controlled means for controlling the supply and release of fluid under pressure to and from the brake cylinder, pneumatically controlled means for controlling the supply and release of fluid under pressure to and from the brake cylinder, and valve means for controlling communication through which said electrically controlled means and said pneumatically controlled means supplies and releases fluid under pressure to and from the brake cylinder.

7. In a braking apparatus, the combination with a brake cylinder, of electrically controlled means for supplying fluid under pressure to the brake cylinder, pneumatically controlled means for supplying fluid under pressure to the brake cylinder, a valve for controlling communication through which said electrically controlled means and said pneumatically controlled means supplies fluid to the brake cylinder, a piston for operating said valve, the fluid pressure on said piston being controlled by said pneumatically controlled means.

8. In a braking apparatus, the combination with a brake cylinder, of electrically controlled means for supplying fluid under pressure to the brake cylinder, pneumatically controlled means for supplying fluid under pressure to the brake cylinder, a valve for controlling communication through which said electrically controlled means and said pneumatically controlled means supplies fluid to the brake cylinder, pistons for operating said valve, the fluid pressure on one piston being controlled by said electrically controlled means and the fluid pressure on the other piston being controlled by said pneumatically controlled means.

9. In an electro-pneumatic brake, the combination with a brake cylinder and a fluid pressure controlled valve device for controlling the supply of fluid under pressure to the brake cylinder and for maintaining the pressure in the brake cylinder against leakage, of electrically controlled means for controlling the operation of said valve device.

10. In an electro-pneumatic brake, the combination with a brake cylinder, valve means for controlling the supply of fluid under pressure to the brake cylinder, and a piston subject to the opposing pressures of the brake cylinder and a chamber for operating said valve means, of electrically controlled means for controlling the fluid pressure in said chamber.

11. In an electro-pneumatic brake, the combination with a brake cylinder, valve means for controlling the supply and release of fluid under pressure to and from the brake cylinder, and a piston subject to the opposing pressures of the brake cylinder and a chamber for operating said valve means, of electrically controlled means for controlling the fluid pressure in said chamber.

12. In an electro-pneumatic brake, the combination with electrically controlled means for effecting a service application of the brakes, of manually operated means for controlling the operation of said electrically controlled means, and pneumatically controlled means for effecting an emergency application of the brakes with high pressure, said pneumatically controlled means being operated upon movement of said manually operated means to emergency position.

13. In an electro-pneumatic brake, the combination with electrically controlled means for effecting a service application of the brakes, of manually operated means for controlling the operation of said electrically controlled means, a brake pipe, valve means operated upon a sudden reduction in brake pipe pressure for effecting an emergency application of the brakes with high pressure, and means controlled by said manually operated means for effecting a sudden reduction in brake pipe pressure.

14. In an electro-pneumatic brake, the combination with electrically controlled means for controlling the brakes, a brake pipe, and pneumatically controlled means operated upon a reduction in brake pipe pressure for controlling the brakes, of manually controlled means for controlling said electrically controlled means, a valve device operated upon a sudden reduction in brake pipe pressure for effecting an emergency application of the brakes with high pressure, and means controlled by said manually controlled means for effecting a sudden reduction in brake pipe pressure.

15. In an electro-pneumatic brake, the combination with two magnets for controlling the brakes, means in circuit with one magnet for permitting energization of said magnet only by current flowing in one direction, means in circuit with the other magnet for permitting energization of said magnet only by current flowing in the reverse direction, and manually controlled means for effecting the energization and deenergization of said magnets, of pneumatically controlled means controlled by said manually controlled means for effecting an emergency application of the brakes with high pressure.

16. In an electro-pneumatic brake, the combination with electrically controlled means operative upon deenergization for effecting a service application of the brakes and manually controlled means having a service position in which said electrically controlled means are deenergized and an emergency position in which said electrically controlled means are also deenergized, of pneumatically controlled means for effecting an emergency application of the brakes with high pressure and operable by said manually controlled means in its emergency position.

17. In a braking apparatus, the combination with electrically controlled means for controlling the brakes and pneumatically controlled means for controlling the brakes, of valve means operative when the brakes are controlled electrically for effecting an emergency application of the brakes with high pressure, and means for rendering said valve means ineffective when the brakes are controlled pneumatically.

18. In a braking apparatus, the combination with electrically controlled means for at one time controlling the brakes and pneumatically controlled means for controlling the brakes at another time, of valve means for effecting an emergency application of the brakes with high pressure, and means operative when the pneumatically controlled means are operating to control the brakes for cutting said valve means out of action.

In testimony whereof I have hereunto set my hand.

THOMAS H. THOMAS.